(12) United States Patent
Zeilinger et al.

(10) Patent No.: US 12,397,501 B2
(45) Date of Patent: Aug. 26, 2025

(54) MANUFACTURING DEVICE AND METHOD FOR ADDITIVE MANUFACTURING WITH MOVABLE GAS FLOW SUPPLY

(71) Applicant: EOS GmbH Electro Optical Systems, Krailling (DE)

(72) Inventors: Stefan Zeilinger, Munich (DE);
Michael Shellabear, Krailling (DE);
Sebastian Mehl, Puchheim (DE);
Wolfgang Untergehrer, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 945 days.

(21) Appl. No.: 17/045,851

(22) PCT Filed: Apr. 2, 2019

(86) PCT No.: PCT/EP2019/058260
§ 371 (c)(1),
(2) Date: Oct. 7, 2020

(87) PCT Pub. No.: WO2019/197212
PCT Pub. Date: Oct. 17, 2019

(65) Prior Publication Data
US 2021/0138554 A1 May 13, 2021

(30) Foreign Application Priority Data
Apr. 13, 2018 (DE) .......................... 102018108833.7

(51) Int. Cl.
*B33Y 30/00* (2015.01)
*B22F 10/28* (2021.01)
(Continued)

(52) U.S. Cl.
CPC ............ *B29C 64/153* (2017.08); *B22F 10/28* (2021.01); *B22F 10/322* (2021.01); *B22F 10/85* (2021.01);
(Continued)

(58) Field of Classification Search
None
See application file for complete search history.

(56) References Cited

U.S. PATENT DOCUMENTS 10,166,603 B2    1/2019   Kawada et al.
10,987,867 B2    4/2021   Bechmann et al.
(Continued)

FOREIGN PATENT DOCUMENTS

CN    105451970    3/2016
CN    105817621    8/2016
(Continued)

OTHER PUBLICATIONS

Wang Wei-Cheng et al, "Flow analysis of the laminated manufacturing system with laser sintering of metal powder. Part I: flow uniformity inside the working chamber", The International Journal of Advanced Manufacturing Technology, Spring-Er, London, vol. 92, No. 1, doi:10.1007/S00170-017-0213-5, ISSN 0268-3768, (Mar. 10, 2017), pp. 1299-1314, (Mar. 10, 2017), XP036297416 [A] 1-15 * the whole document * * abstract * DOI: http://dx.doi.org/10.1007/s00170-017-0213-5, 16 pages.
(Continued)

*Primary Examiner* — Armand Melendez
(74) *Attorney, Agent, or Firm* — Polsinelli PC

(57) ABSTRACT

The invention relates to a manufacturing device for the additive manufacturing of a three-dimensional object and a corresponding method. The object is manufactured by applying a building material in layer-wise form and selectively solidifying the building material at points correspond-
(Continued)

ing to the cross-section of the object. The points are scanned with at least one exposure area, and, during operation, a movable gas inlet approaches a reference process point and/or a target flow supply zone assigned to the reference process point for the flow supply with the process gas, and the process gas is discharged via a stationary gas outlet.

7 Claims, 5 Drawing Sheets

(51) Int. Cl.
*B22F 10/322* (2021.01)
*B22F 10/85* (2021.01)
*B22F 12/70* (2021.01)
*B29C 64/153* (2017.01)
*B29C 64/364* (2017.01)
*B29C 64/371* (2017.01)
*B29C 64/393* (2017.01)
*B33Y 10/00* (2015.01)
*B33Y 50/02* (2015.01)
*B22F 10/77* (2021.01)
*B22F 12/00* (2021.01)

(52) U.S. Cl.
CPC ............ *B22F 12/70* (2021.01); *B29C 64/371* (2017.08); *B29C 64/393* (2017.08); *B33Y 10/00* (2014.12); *B33Y 30/00* (2014.12); *B33Y 50/02* (2014.12); *B22F 10/77* (2021.01); *B22F 12/22* (2021.01)

(56) References Cited

U.S. PATENT DOCUMENTS

| | | |
|---|---|---|
| 2016/0136731 A1 | 5/2016 | McMurtry et al. |
| 2017/0014905 A1 | 1/2017 | Kawada et al. |
| 2017/0072468 A1 | 3/2017 | Schilling et al. |
| 2018/0043432 A1 | 2/2018 | Domrose |
| 2018/0133967 A1 | 5/2018 | Bechmann et al. |
| 2018/0185961 A1 | 7/2018 | Meidani et al. |
| 2018/0236550 A1 | 8/2018 | Herzog |
| 2018/0345371 A1* | 12/2018 | Mamrak ................ B33Y 10/00 |
| 2020/0114425 A1* | 4/2020 | Ott ........................ B33Y 10/00 |

FOREIGN PATENT DOCUMENTS

| | | |
|---|---|---|
| CN | 107530962 | 1/2018 |
| DE | 102014209161 | 11/2015 |
| DE | 102016112652 | 1/2017 |
| DE | 102015010387 | 2/2017 |
| DE | 102015121748 | 6/2017 |
| EP | 3050666 | 8/2016 |
| EP | 3321009 A1 | 5/2018 |
| JP | 2018003148 | 1/2018 |
| WO | 2014199150 | 12/2014 |

OTHER PUBLICATIONS

Chinese Office Action for Application No. 201980025733.1, dated Jun. 30, 2022, 8 pages.

* cited by examiner

MANUFACTURING DEVICE AND METHOD FOR ADDITIVE MANUFACTURING WITH MOVABLE GAS FLOW SUPPLY

TECHNICAL FIELD OF THE INVENTION

The invention relates to a manufacturing device and a method for the additive manufacturing of a three-dimensional object using such a manufacturing device, wherein the object is manufactured by applying a building material layer by layer and selective solidification of the building material, in particular by the supply of radiant energy, at points in each layer which are assigned in this layer to the cross-section of the object, whereby the points are scanned or influenced with at least one exposure area, in particular a radiation exposure area of an energy beam bundle.

BACKGROUND OF THE INVENTION

Additive manufacturing devices and associated methods are generally characterised in that objects are manufacturedmanufactured in them by solidifying a shapeless building material layer by layer. The solidification can be brought about for example by the supply of thermal energy to the building material by means of irradiation of the latter with electromagnetic radiation or particle radiation, for example in laser sintering ("SLS" or "DMLS") or laser fusion or electron beam fusion. For example, in laser sintering or laser fusion the exposure area of a laser beam ("laser spot") onto a layer of the building material moves over those points of the layer which correspond in this layer to the cross-section of the object to be manufacturedmanufactured. Instead of introducing energy, selective solidification of the applied building material can also take place by means of 3D-printing, for example by applying an adhesive or a binder. Generally, the invention relates to the manufacturing of an object by means of layer-by-layer application and selective solidification of a building material irrespective of the manner in which the building material is solidified. Use can be made of different types of building materials, in particular powder such as e.g. metal powder, plastic powder, ceramic powder, sand, filled or mixed powder.

In the course of the solidification in additive manufacturing processes, impurities often arise which can penetrate into the process chamber above the building field. DE 10 2014 209 161 A1 relates to a device for the manufacturing of a three-dimensional object by layer-by-layer solidification of building material at the points in the respective layer corresponding to the cross-section of the object to be manufactured by the introduction of energy. It relates moreover to a control unit for such a device and to a method for moving and/or orientating a gas extraction nozzle.

SUMMARY OF THE INVENTION

The purpose of the invention is to counteract as efficiently as possible contamination inside the process chamber, in particular in large-field machines.

To solve this problem, the manufacturing device according to the invention for the additive manufacturing of a three-dimensional object is equipped with a building container for receiving the building material, with a process chamber above the building container, with a building field between the building container and the process chamber, with at least one gas inlet movable inside the process chamber and with at least one stationary gas outlet.

The building container can comprise a building platform, which during operation carries the component to be manufacturedmanufactured and surrounding unsolidified building material. An opening plane of the building container defines an (essentially horizontal) building field, which represents a working plane in which the building material is applied in a metered manner as an individual layer. The building field thus usually extends essentially over the base area of the building container. Moreover, the process chamber is located as a hollow space above the building field or the working plane in which at least one coating device operates.

The manufacturing device can in particular comprise a guiding device, e.g. a laser scanner unit, for guiding at least one energy beam bundle of the radiant energy through at least one section of the process chamber onto the building field. As a basis for the guidance, the points in each layer, which are assigned in this layer to the cross-section of the object, serve as geometrical locations of the planned exposure to the radiant energy. The guiding device can couple one or more energy beam bundles directed onto the building field for example through a transparent coupling window at the upper side of the process chamber. The location or locations at which the energy beam bundle or bundles strike the building field and therefore the building material, and proceeding from which solidification of the building material ("actually") takes place, is/are denoted as a radiation exposure area. As already described further above, the selective solidification of the building material can take place with different methods. The conceptual difference between exposure area and radiation exposure area is based in the following on whether a selective solidification takes place without radiation—then one speaks of "exposure area"- or with the use of radiation—than one speaks of "radiation exposure area". The invention is not limited to radiant energy as a means for the selective solidification. During the scanning of the building material with a radiation exposure area, the radiation onto the building material acts in the radiation exposure area in such a way that a solidification of at least one uppermost layer of the building material is brought about. As a result of the energy supply in the radiation exposure area, the building material is partially or completely melted, as a result of which the components of the building material, for example powder grains, bind together. After its cooling, the former building material is then present as a solid body.

In order to make it clear that the area of the radiation exposure area on the building material does not necessarily have to be very small ("point-like"), the term "energy beam bundle" is often also used in this application. It is also used within the scope of the application, however, as distinct from further radiation sources which may be used to heat the building material, e.g. IR radiant heating. The "energy beam bundle" is defined such that a sufficient radiation intensity is provided over its radiation exposure area on the building field in order to solidify the underlying building material with a depth extent of at least one layer. The invention is however not restricted to energy beam bundles as radiation energy.

An additive manufacturing device can comprise a number of radiation sources for generating radiation and a number of guiding devices connected to the latter for directing the radiation onto the building material. In particular, precisely one radiation exposure area on the building material is preferably assigned to a guiding device. The radiation sources can for example be one or more gas or solid-state lasers or another kind of lasers such as for example laser diodes, in particular VCSELn (Vertical Cavity Surface Emitting Laser) or VECSELn (Vertical External Cavity Surface Emitting Laser) or a row of these lasers.

The process gas to be introduced into the process chamber through the gas inlet and discharged through the gas outlet can be a gas mixture or a pure gas. In specific additive manufacturing processes, use is often made of process gas with a high proportion of inert gas, e.g. argon or nitrogen. In some cases, use of cost-effective gas mixtures may suffice, the composition of which corresponds for example to ambient air.

According to the invention, the manufacturing device comprises at least one gas inlet for the flow supply with process gas, which is arranged in the process chamber. The gas inlet can comprise a device, e.g. a nozzle or a housing, optionally with a connected gas supply line from the process gas supply. Within the scope of the application, however, the gas inlet is understood in particular as an opening from which the gas flows into the process chamber. The gas inlet opening thus forms an interface between a hollow space of the gas supply device and a hollow space formed by the process chamber. When it leaves the gas inlet, a process gas flow is transformed from a guided jet into an unguided jet or a free jet. The gas inlet or the gas inlets can be moved inside the process chamber essentially over the entire building field. Mention is usually made in the following of only a single gas inlet, even though a plurality of gas inlets—insofar as advisable—are possible according to the invention and are in principle intended to be included by the description.

In contrast with a global injection, wherein a complete building field or a volume inside the process chamber above the building field is exposed to a flow, wherein the base area of the volume at least corresponds to the extent of the building field, the movable gas inlet acts locally, in that it approaches only a partial area of the building field, i.e. covers a partial volume above the building field, wherein the base area of the volume corresponds to a partial area of the building field.

The gas outlet or gas outlets, on the other hand, are stationary, i.e. stationary relative to the process chamber, and viewed in a plan view are arranged outside the building field, for example in a wall of the process chamber. They can comprise an extraction. Mention is made in the following of only one single gas outlet, even though a plurality of gas outlets—insofar as advisable—is possible according to the invention and in principle intended to be included by the description The invention thus avoids providing either only a combination of stationary gas inlets and outlets which often suffices in the case of manufacturing devices with a relatively small building field, or only a combination of movable gas inlets and outlets, which can involve a high coordination and control outlay. With the combination of a movable gas inlet and a stationary gas outlet, the invention instead pursues the principle of creating an arbitrarily short distance between the gas inlet and an undesired impurity above the building field and thus enabling a targeted removal of the impurity from the process chamber atmosphere. In contrast with a stationary gas inlet, the use of a gas inlet with a relatively short extension of its gas inlet opening and the use of a relatively small gas volume can advantageously suffice for this purpose.

The invention pursues the aim of reducing and/or removing atmospheric impurities by means of an inflow and therefore displacement and/or dilution of the impurity with an impurity-free process gas or a process gas that is at least low in impurities. A target flow supply zone of a process gas which has flowed into the process chamber by means of the movable gas inlet is typically a partial area of the process chamber preferably close to the building field. Viewed in a vertical projection onto the building field, it can lie inside the building field outline and/or outside the building field outline, i.e. above a process chamber floor surrounding the building field. The target flow supply zone preferably comprises an area in which one or more beam paths of one or more energy beam bundles runs/run at least in sections at the present time. A location, an extension and/or an orientation of the target flow supply zone can in principle be constant or variable. It or its dynamic change can in each case be at least indirectly dependent on location/extension/orientation of the radiation exposure area or its dynamic change. A position of the target flow supply zone can be coordinated with a position of the gas inlet or move with it. The target flow supply zone, in the vertical plan view onto the building field and viewed from the gas inlet or inlets, typically lies essentially downstream of the radiation exposure area or areas. The target flow supply zone can be understood as a minimum coverage area of a local flow supply through a movable gas inlet, wherein a minimum degree of effectiveness or cleaning effect is preferably assumed in the minimum coverage area. In this case, therefore, an actual zone of the flow supply may be larger by means of the gas inlet. The shorter the distance of the gas inlet is to the target flow supply zone, the more concentrated its effect can be there. Optionally, i.e. not necessarily, the target flow supply zone can cover a radiation exposure area and optionally a surrounding area of the radiation exposure area on the building field surface.

The aim of keeping clean or cleaning of the target flow supply zone is thus achieved by the solution according to the invention. A dispersion or spread of the impurity downstream of the radiation exposure area due to the free jet can for example be countered, in that the gas outlet opening of a stationary gas outlet has a larger extent than the gas inlet opening especially of the movable gas inlet, so that the impurity despite a certain spread can be pushed directly into the gas outlet. A thinning-out of the impurity accompanying its spread, moreover, brings about a reduced degree of disruption, if an energy beam bundle passes through it before its removal from the process chamber.

In addition, with increasing distance of their unlimited course, free jets lose both a clear direction and also speed on account of their fanning-out. The device according to the invention makes a distance between gas inlet and gas outlet able to be varied or shortened and thus upholds a target accuracy and efficiency of an unguided process gas flow with regard to its displacing and therefore cleaning function. It thus gains all the more value, the larger a building field is and the greater the distance between a stationary gas inlet arranged along the building field and a stationary gas outlet. This makes its use profitable especially in the case of large-field plants, without requiring a comparably high coordination and control outlay, which a combination of likewise movable gas inlets and outlets signifies. In contrast with a small-field plant, a large-field plant can for example have a building field, whereof the shortest side length of a rectangular building field or the diameter thereof in the case of a circular building field amounts to at least 400 mm, preferably at least 800 mm, particularly preferably at least 1000 mm.

The efficiency of the arrangement according to the invention is ensured both by the movable gas inlet and also by the preferably wide stationary gas outlet: The movable gas inlet can be advanced close to a radiation exposure area to a target flow supply zone and can act there in a locally concentrated manner.

On the other hand, the gas outlet, on account of its stationary arrangement relative to a building field side, at which it is arranged, can have a greater extension of its outlet opening than the inlet opening of the movable gas inlet. A horizontal extension of the outlet opening of the gas outlet preferably corresponds to at least the length of the building field side along which the gas outlet extends, or a longest extension of the building field essentially parallel to the gas outlet. A comparatively large horizontal, but also vertical extension of the opening of the gas outlet works against the efficient coverage of the process gas flow jetted in locally as a free jet and thereby widening or of the process gas volume blown away. The stationary arrangement of the gas outlet saves its costly movable construction and its control. The combination according to the invention of a movable gas inlet and a stationary gas outlet thus promotes overall a cost-effective manufacturing and such an operation of the above manufacturing device.

At least experimentally, it can be established that there is a detectable difference in effect between injection through a gas inlet and an extraction through a gas outlet. Accordingly, the effectiveness of an injection is several times greater than that of an extraction. According to the invention, therefore, the gas inlet is provided for the approach and the controlled flow supply of a target flow supply zone. It can in addition be combined with an extraction of the gas outlet in order to achieve a still higher degree of effectiveness.

In the case of the selective solidification of metal, in comparison with other additive manufacturing processes, an increased amount of contamination of the process chamber atmosphere may possibly occur. The contamination can include for example splashes, smoke, condensate or other suspended particles. It can absorb or scatter at least a part of the radiant energy directed in the form of the energy beam bundle towards the building field before said radiant energy reaches the building field, as a result of which a solidification process can be impaired. Use of the invention in connection with additive manufacturing processes and devices is thus particularly advantageous, in which a metallic or at least metal-containing building material is used, which contains at least 50% by volume, preferably at least 80% by volume, particularly preferably at least 90% by volume of metal. The metallic building material can for example be a homogeneous metal powder or a metal alloy powder.

According to an embodiment of the invention, the gas inlet opening can be movable in a lower half, preferably in a lowest fifth, particularly preferably in a lowest tenth of the process chamber related to a clear height of the process chamber, in each case viewed perpendicular to the building field. Since a process chamber can comprise a fissured interior space, e.g. a non-uniform height level of the roof, the term "clear height" relates to a maximum internal height of the process chamber. For example, the stated values with regard to the clear height of the process chamber can correspond to a distance value in an operation of the gas outlet as intended of less than or equal to 20 cm, preferably less than or equal to 10 cm, particularly preferably less than or equal to 5 cm from the building field. In the stated height ranges of the process chamber, a particularly high effectiveness of the gas outlet is to be expected. Moreover, it is thus distinguished from a roof flow supply, which usually acts for example in an upper half or in an upper quarter of the process chamber and in particular serves for purging or shielding of a coupling window for the supply of radiant energy. The gas inlet is moreover preferably arranged essentially horizontally. It thus jets the gas for example horizontally or slightly obliquely onto the building field directed into the process chamber. It thus differs in principle from a flow directed downwards and introduced over a comparatively large area, which, similar to a clean room flow, reduces an ascent of impurities into an upper area of the process chamber or keeps impurities close to their place of origin in the lower area of the process chamber, while they are diluted or removed. The gas outlet can also be arranged at a height level corresponding to the gas inlet, preferably in a wall of the process chamber.

The movable gas inlet can in principle be displaced in translation or displaced in rotation. According to a further embodiment of the invention, the gas inlet can be moved in more than one degree of freedom in translation and also or alternatively in at least one degrees of freedom in rotation, preferably in precisely two degrees of freedom in translation and in precisely one degree of freedom in rotation. According to the preferred embodiment, its translatory movement is thus accompanied by a rotational movement, so that it is movable both in translation and in rotation. The degrees of freedom in translation of the gas inlet relate to the spatial directions of the process chamber, its degrees of freedom in rotation to its rotary axes. It can preferably be moved in both spatial directions parallel to the building field or to the working plane and rotated at least about a rotational axis perpendicular to the building field. The rotation can be understood to mean both rotation as well as swivelling. It can thus not only cover the entire building field itself, but react more quickly to a change in location of the radiation exposure area on the building field and expose the corresponding target flow supply zone to a flow more quickly. This is because, with a rotation, the gas inlet can be aligned if need be more quickly on a new location of the radiation exposure area or the target flow supply zone than by a displacement. Time-consuming displacement movements of the gas inlet parallel to the building field plane can thus be dispensed with and replaced by more rapid rotations about an axis perpendicular to the building field plane.

According to a further embodiment of the invention, the gas inlet, in a vertical plan view, can be moved over the building field, in particular solely over the building field. An effect-promoting proximity of the gas inlet to the striking point of the supply of radiant energy or to the radiation exposure area or to the target flow supply zone can thus be achieved. This does not exclude the fact that the gas inlet can also be moved laterally with regard to the latter, i.e. beside or outside the building field. The position of the opening of the gas inlet in the plan view is of particular importance here. In contrast with a housing of a gas inlet, which can have a comparatively large extension, it is locally clearly defined in plan view, since it is typically arranged at an edge of the housing of the gas inlet. Since its process gas jet does not become a free jet until it has passed through an opening of the gas inlet, a special form of a three-dimensional opening geometry of the gas inlet, for example as a nozzle or confuser, in which the speed of the gas flow increases, can be disregarded in this case. The mobility of the gas inlet may possibly be mechanically independent of the mechanical guidance of the supply of radiant energy on the building field.

According to a further embodiment of the invention, the number of the gas inlets can diverge from the number of the activatable energy beam bundles, which bring about a supply of the radiant energy to the radiation exposure area. The number of the gas inlets preferably diverges from the number of the energy beam bundles which can be guided independently of one another. These variants cover for example a use of line illuminators or laser diode banks and scanner-based devices for providing radiant energy or energy beam bundles. Thus, for example, two or more gas inlets can be assigned to a single solidifying energy beam bundle, in order to remove impurities more effectively from the target flow supply zone and/or to further reduce undesired oxidation of the building material to be solidified. Conversely, two or more energy beam bundles can also be assigned to just one gas inlet, for example when their respective radiation exposure areas lie directly beside one another or coincide. At all events, there must be no forced coupling of energy beams or their radiation exposure areas and a corresponding number of gas inlets, as long as there is a sufficient flow supply of each target flow supply zone. Decoupling, in terms of number, of energy beams or radiation exposure areas on the one hand and of movable gas inlets on the other hand can on the one hand save time-consuming travel paths of gas inlets and on the other hand enable a needs-based flow supply of more highly contaminated areas of the process chamber.

According to a further embodiment of the invention, the manufacturing device can therefore comprise more than two movable gas inlets independent of one another. With regard to their mobility, they are therefore not coupled to one another, so that they can each simultaneously control separate radiation exposure areas or target flow supply zones. The aforementioned time saving and flow supply intensity explained above can thus be achieved.

The arrangement of movable gas inlets in principal independently of one another does not exclude the fact that they are moved in a more favourable manner in common, i.e. simultaneously and aligned in the same direction, during a manufacturing process, for example on grounds of procedural economy. According to a further embodiment of the invention, a plurality of gas inlets can be constituted not only in terms of the process, but also at least partially capable of being mechanically coupled and as such of moving in common. The mechanical coupling can thus be designed reversible and can be activated or deactivated per control device during the manufacturing process. A deactivatable mechanical coupling of the gas inlets can for example be based on arms which can be moved over the building field, on which the gas inlets for their part are each attached displaceably and rotatably or capable of being swivelled. The movable arms can provide for the displaceability of the gas inlets in a first spatial direction, the displaceability of the gas inlets on the arms for a displaceability in a second spatial direction. A mechanical coupling of the arms to one another brings about a coupling of the movement of the gas inlets in the first spatial direction. Similarly, the second spatial direction and the rotation of the gas inlets can be coupled with one another, in order to enable a common control instead of an individual control in each case and thus to reduce control outlay for the gas inlets.

According to a further embodiment of the invention, the manufacturing device can, in addition to a movable gas inlet, comprise a further, but stationary gas inlet or a plurality of such gas inlets for process gas. This can involve large-volume, but comparatively slow inflows, which for example bring about a vertically downwards directed flow, which as far as possible covers the entire building field. Alternatively or in addition, it may be a lateral inflow with a higher speed. The stationary gas outlet can be available also for collecting the additional gas volume that has flowed in. In any event, the additional gas inlet can support the movable gas inlet in its function, in that it helps to discharge possibly cloudy gas volumes in the process chamber that are to be replaced.

The problem mentioned at the outset is also solved by a method for the manufacturing of a three-dimensional object by means of an additive manufacturing device of the type described above with at least one movable gas inlet and at least one stationary movable gas outlet for process gas, wherein the object is manufactured by the application of a building material layer upon layer and selective solidification of the building material, in particular by means of supplying radiant energy, at points in each layer which are assigned in this layer to the cross-section of the object, in that the points are scanned with at least one exposure area, in particular a radiation exposure area of an energy beam bundle, wherein a movable gas inlet during operation approaches a reference process point and/or a target flow supply zone assigned to the reference process point of the flow supply with the process gas, and the process gas is discharged via a stationary gas outlet.

A "reference process point" can comprise one or more (radiation) exposure area(s) present at a point in time (in particular of the energy beam bundle or bundles) on the building field. Optionally, it can also comprise a defined movement area of the (radiation) exposure area(s), the extent whereof can be defined for example by a predetermined time span, in which the current (radiation) exposure area(s) is/are moved on the building field. It is preferably understood as a two-dimensional section from the working plane or the building field surface. The reference process point can, for example depending on a given applied irradiation strategy, for example be a section of a stripe or a path ("stripe" irradiation strategy), which is typically defined by a constant maximum width. Alternatively, it can comprise for example—in part or completely—the area of a "chess field" in a so-called "chess" irradiation strategy. The stripes and chess fields mentioned by way of example are usually "hatched out" in terms of high frequency by the energy beam bundle. A location, an extension and/or an orientation of the target flow supply zone or their dynamic change can be dependent at least indirectly on the location/extension/orientation of the reference process point or their dynamic change.

With the approach and flow supply to a reference process point and/or a target flow supply zone by means of a movable gas inlet and with the removal of the gas via stationary gas outlet, the invention pursues the principle of first purging only the target flow supply zone and in the course thereof or subsequently conveying a possibly contaminated gas volume as its spreads or moves out of an area above the building field and at the same time diluting it with process gas before it is finally removed from the process chamber. The aim of an impurity-free supply of radiant energy onto the building field is thus just as well achieved, but without the control expenditure of movable gas inlets and gas outlets and without the use or throughput of large gas volumes.

According to an embodiment of the invention, more than one gas inlet can be assigned during operation to a reference process point and/or to a target flow supply zone. Two or more gas inlets can thus approach a single reference process point and/or a target flow supply zone in the building field, in order to expose the reference process point and/or target flow supply zone more effectively to process gas and thus to effectively counteract an impurity there.

The method can include a coordination of a gas inlet providing a flow to a reference process point and/or a target flow supply zone depending on a current position and/or orientation of the reference process point and/or of the target flow supply zone on the building field, wherein the travel path of the gas inlet can be made dependent on the movement of the reference process point and/or of the target flow supply zone in the course of an irradiation strategy. According to a further embodiment of the invention, the method can include a control of the gas inlet which is such that the reference process point and/or the target flow supply zone always lies, in a plan view onto the building field, in a predefined flow course zone between the opening of the gas inlet and the opening of the gas outlet. The flow course zone can be constituted as a path area, a triangular area, a parabola area, or a trapezoidal area. A shape or extent of the flow course zone can be determined for example by taking account of a measurement and/or a simulation of an impurity. The control takes place for example by means of suitable programming, but in any case not by means of a mechanical coupling of the movement of the gas inlet on the one hand and a guiding device for the supply of radiant energy on the building field on the other hand. It could be too inflexible to handle and too slow. The control of the gas inlet is instead orientated to the reference process point and/or the target flow supply zone in the building field, in such a way that it brings the gas inlet onto a roughly linear path with the reference process point and/or the target flow supply zone and the gas outlet, wherein the reference process point and/or the target flow supply zone expediently lies between the gas inlet and the gas outlet or between their openings.

The concept of the path instead of a straight line as a geometrical location of the reference process point and/or the target flow supply zone between the gas inlet and the gas outlet implies a certain amount of blurring or tolerance transversely to the extension direction of the path. In fact, proceeding from the gas inlet, there is a widening of the exiting process gas jet when it leaves the outlet opening, so that—viewed in a plan view onto the building field and at least in the case of a frontal alignment of the gas inlet onto the gas outlet—an equilateral triangle can, for simplification or diagrammatically, be assumed as the effective area of the process gas inlet jet above the building field. The apex of the triangle lies at the centre point of the inlet opening of the gas inlet and its base on or parallel to the outlet opening of the gas outlet. With the triangle as a possible location of the reference process point and/or the target flow supply zone, there is a greater tolerance for the control of the gas inlet, which leads to smaller travel paths and therefore to a quicker reaction of the control of the rapidly changing position of the reference process point and/or of the target flow supply zone typically taking place during the manufacturing of the object. With an orientation of the gas inlet set at an angle with respect to the gas outlet, only an asymmetrical triangle results instead of an equilateral one.

If the gas inlet is not reduced to the centre point of its inlet opening, but also takes account of its width, the control with a frontal orientation of the gas inlet with respect to the gas outlet can assume an equilateral trapezium as a possible location of the reference process point and/or the target flow supply zone. The shorter base line of the trapezium is assigned to the inlet opening, the longer one to the outlet opening. A still greater tolerance with the aforementioned advantages is thus offered. A more highly tolerated control can thus be derived, even for a gas inlet which is set at an angle with respect to the gas outlet. A description or definition of the course of a gas free jet and therefore the progressive movement of a thus displaced and diluted impurity inside the process chamber by means of simple geometrical shapes offers, compared to as realistic as possible a measurement-based detection or simulation of the possibly dynamic position and shape of the impurity, the advantage of a simple and efficient conversion into a control of the gas inlet that can require less storage and computing outlay with any comparable efficiency.

The guiding device for the supply of radiant energy into the process chamber usually reacts more quickly than a gas inlet can travel. The method for the control therefore endeavours to avoid unnecessary manoeuvres of the gas inlet. According to a further embodiment of the invention, the method for controlling the gas inlet can take account of the fact that an angle, which the opening planes of the gas inlet and gas outlet and/or which a mean flow direction when the process gas exits from the gas inlet and a normal erected on an opening plane of the gas outlet enclose with one another in plan view onto the building field, always falls below or does not exceed a predefined angle threshold value with one another. The mean flow direction can be an arithmetical mean of a number of flow directions. It can be determined for example by measurement or by means of a simulation or by derivation of the three-dimensional geometry of the gas inlet. Since a displacement of the gas inlet usually requires a greater amount of time than a rotation, the former is to be preferred from the control standpoint. The alignment of the gas inlet in only a limited angular range with respect to the gas outlet leads moreover to a reliable coverage of the gas volume above a reference process point, because the effective directions of the gas inlet and of the gas outlet cannot therefore greatly deviate from one another. When a plurality of process gas inlet jets strike one another, a certain jet deflection of the inflowing process gas can also be favourably taken into account. In the case of a formation of a stationary gas outlet as an extraction, a suction pulse on an inflowing gas volume can also influence its flow direction. For example, when the process gas inlet jet is set at an angle with respect to the opening plane of the gas inlet, a resultant jet deflection of the inflowing process jet can be favourably taken into account.

The method for the control can assign at least one movable gas inlet to a reference process point and/or a target flow supply zone. According to a further embodiment of the invention, the method can observe a previously defined maximum distance of the gas inlet from a reference process point and/or target flow supply zone assigned to it. The control method thus ensures during operation that the gas inlet is not moved beyond a maximum distance value from the reference process point and/or the target flow supply zone. The effectiveness of keeping clear or purging the reference process point and/or the target flow supply zone can thus be guaranteed.

According to a further embodiment of the invention, the method can observe a previously defined minimum distance of the gas inlet from a reference process point and/or target flow supply assigned to it. The control method thus ensures during operation that the gas inlet does not approach the radiation exposure area and/or the reference process point and/or the target flow supply zone below a minimum distance value. In the case of a small opening cross-section of the gas inlet for example, the effectiveness of keeping clear or purging the reference process point and/or of the target flow supply zone is thus guaranteed, in that spreading of the free jet in the free space is included in the calculation by taking account of the speed of the gas that has flowed in, so that the process gas jet meets a minimum requirement on the displacement or cleaning capacity from the minimum distance value.

According to a further embodiment of the invention, the method can split up the building field by computation or virtually into a plurality of building field segments and assign at least one movable gas inlet, instead of to a reference process point and/or a target flow supply zone, at least temporarily to a predefined building segment, in which a current reference process point and, above the latter, a current target flow supply zone lies. The building field segmentation does not necessarily have to be fixed for the duration of the manufacturing process of a component, but can be changed during the latter. It can be guided by a requirement arising in each case and possibly not until during the manufacturing process. Alternatively or in addition, the segmentation can take place in a flow-orientated manner, for example on the basis of using a plurality of energy beam bundles, the number of gas inlets and/or outlets or on account of a partial or complete overlap of the working areas of the energy beam bundles suitable for the solidification on the building field. The segmentation can be variable specific to the layers and dependent on a specific distribution, geometry, extension etc. of component cross-sections in a layer. The method can thus define a requirement threshold, by which a control of one or more gas inlets is guided. The basis for a control of a gas inlet can thus be established with the aim of a movement as continuous as possible or for an optimisation of its movement course and in particular for a simplification of the control of the gas inlet. For example, a distance or a route of a movement of a gas inlet in coordination with a scanning path of one or more energy beam bundles on the building field can be shortened or simplified using a travelling salesman algorithm and/or a smoothing function in a control.

In principle, the method can include the control of a plurality of movable gas inlets independently of one another, in order to ensure a needs-based inlet of process gas to one or to a plurality of reference process points and/or target flow supply zones. According to a further embodiment of the invention, the method can enable an interconnection of at least two movable gas inlets. The interconnection or control-based coupling of the gas inlets can be at least temporally present during a manufacturing process and thus for this time span reduce a control expenditure of the gas inlets. It may be applied or required when for example a plurality of radiation exposure areas solidify a locally limited area of the building field simultaneously or with a time overlap or directly adjacent spatially. An increased requirement on a flow supply with process gas may then occur. It does not however necessarily have to be served by separately controlled gas inlets, but can be approached by those whose fixed position relative to one another is defined at least for a temporally limited operating state. The interconnection can for example bring about an at least temporally unidirectional displacement and/or rotation of the gas inlets.

According to a further embodiment of the invention, the method can coordinate at least two movable gas inlets in such a way that, viewed in a vertical plan view onto the building field,
- the gas inlets with an identical orientation or alignment inside the process chamber and above the building field and/or with an identical mean flow supply direction are not positioned behind one another or, regarding their mean flow supply direction as the axis of the gas inlets, are not positioned coaxially, and/or
- the gas inlets are positioned rotated and/or displaced with respect to one another in such a way that the respective mean flow supply directions do not intersect one another, and/or
- the flow course zones and/or the target flow supply zones assigned respectively to the gas inlets do not overlap one another, i.e. they remain free from overlap.

The coordination of the gas inlets can thus be guided by a mean flow supply direction of the gas inlets, by the flow course zones of the flow cone proceeding from them or by the target flow zones assigned to them as a control criterion. The mean flow supply directions can be determined for example by an arithmetical mean of a number of measured or simulated flow directions, in which gas from a gas inlet flows into the process chamber. They form a criterion which permits overlaps of the flow course zones or the target flow supply zones, but can lead to a smaller control requirement and therefore to a more rapid reaction of the gas inlets to the movement of the radiation exposure area. Conversely, the flow course zones or the target flow supply zones as control criteria maximise the flow supply area.

The problem mentioned at the outset is also solved by a control method for performing a method for producing a three-dimensional object by means of an additive manufacturing device with at least one movable gas inlet for introducing process gas into a process chamber and at least one stationary gas outlet for discharging the process gas, wherein the object is manufactured by the application of a building material layer upon layer and selective solidification of the building material, in particular by means of supplying radiant energy, at points in each layer which are assigned in this layer to the cross-section of the object, in that the points are scanned with at least one exposure area, in particular a radiation exposure area of an energy beam bundle, wherein the control method is constituted such that it controls the movable gas inlet and/or the stationary gas outlet in such a way that during operation the movable gas inlet approaches a reference process point and/or a target flow supply zone assigned to the reference process point for the flow supply with the process gas, and the process gas is discharged via the stationary gas outlet.

A generation of control command data in the context of the control method can be implemented for example in the form of hardware and/or software components in a computing device. The computing device can for example be part of the above manufacturing device for the additive manufacturing of a three-dimensional object itself, for example as part of a control system or suchlike. Alternatively, the generation of the control command data can proceed independently and separately, i.e. be carried out spatially separated from the manufacturing device. The generated control command data can then be fed to the manufacturing device by means of suitable interfaces, for example via a memory stick, a movable hard disc or another transportable data carrier as well as via cable-based or cableless networks or "Cloud" solutions.

The problem mentioned at the outset is also solved by a computer program product with a computer program, which can be loaded directly into a memory device of a control data generation device and/or of a control device of the aforementioned manufacturing device for the additive manufacturing of a three-dimensional object, with program sections in order to carry out all the steps of a method according to the invention, when the computer program is executed in the control data generation device and/or in the control device. An implementation of the invention carried out largely by software has the advantage that previously used control devices can also be retrofitted in a straightforward manner by a software or hardware update in order to operate in the manner according to the invention. Such a computer program product can comprise, apart from the computer program, optionally additional components such as for example documentation and/or additional components, also hardware components, such as for example in a hardware key (Dongles etc.) for using the software. For the transport to the control device and/or for the storage on or in the control device, a computer-readable medium, for example a memory stick, a movable hard disc or another transportable or integrated data carrier can be used, on which the program sections of the computer program readable and executable by a computing device for generating control command data and/or the control device are stored.

BRIEF DESCRIPTION OF THE DRAWINGS

The principle of the invention is explained in greater detail below by way of example with the aid of a drawing. In the figures.

DETAILED DESCRIPTION OF THE EMBODIMENTS

Figure 1:
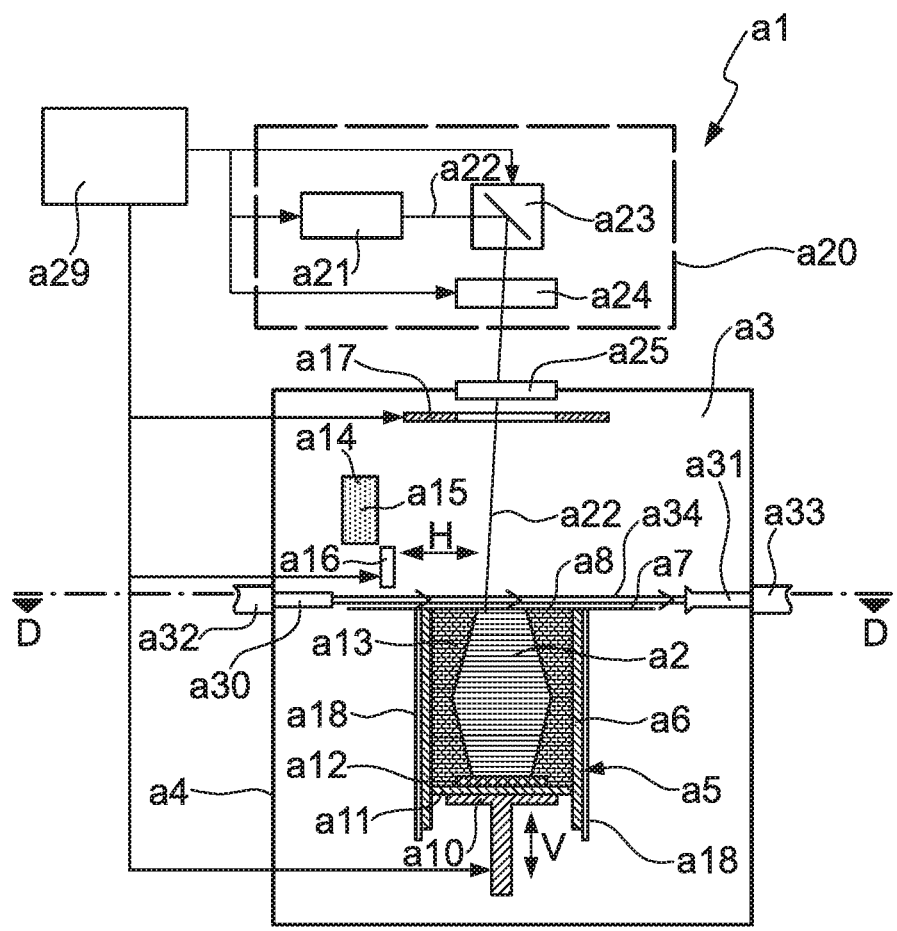
FIG. 1: shows a diagrammatic view, represented partially in cross-section, of a device for the additive manufacturing of manufacturing products according to the prior art.

The device represented diagrammatically in FIG. 1 is a laser sintering or laser fusion device a1 known per se. For the building of an object a2, it contains a process chamber a3 with a chamber wall a4. An upwardly open building container a5 with a wall a6 is arranged in process chamber a3. A working plane a7 is defined by the upper opening of building container a5, wherein the area of working plane a7 lying inside the opening, which can be used for building up object a2, is referred to as building field a8.

Arranged in container a5 is a carrier a10 movable in a vertical direction V, to which a base plate a11 is fitted, which terminates building container a5 downwards and thus forms the bottom thereof. Base plate a11 can be a plate formed separately from carrier a10, which plate is attached to carrier a10, or it can be formed integrally with carrier a10. Depending on the powder used and the process, a building platform a12 can also be fitted on base plate a11, on which platform object a2 is built up. Object a2 can however also be built up on base plate a11 itself, which then serves as a building platform. In FIG. 1, object a2 to be formed in building container a5 on building platform a12 is represented below working plane a7 in an intermediate state with a plurality of solidified layers, surrounded by building material a13 which has remained unsolidified.

Laser sintering device a1 also contains a storage container a14 for a powder-like building material a15 which can be solidified by electromagnetic radiation and a coater a16 movable in a horizontal direction H for applying building material a15 onto building field a8.

Laser sintering device a1 also contains an illumination device a20 with a laser a21, which generates a laser beam a22 as an energy beam bundle, which is deflected by a deflection device a23 and focused onto working plane a7 by a focusing device a24 via a coupling window a25, which is fitted at the upper side of process chamber a3 in its wall a4 onto which working plane a7 is focused.

Laser sintering device a1 also contains a control unit a29, via which the individual components of device a1 are controlled in a coordinated manner to perform the building process. Control unit a29 can contain a CPU, the operation of which is controlled by a computer program (software). The computer program can be stored separated from the device on a storage medium, from which it can be loaded into the device, in particular into the control unit.

During operation, carrier a10 is first lowered for the application of a powder layer by a height which corresponds to the desired layer thickness. A layer of powder-like building material a15 is then applied by moving coater a16 over working plane a7. To be on the safe side, coater a16 pushes a somewhat larger quantity of building material a15 in front of it than is required for the building of the layer. The intentional excess of building material a15 is pushed by coater a16 into an overflow container a18. An overflow container a18 is arranged in each case on both sides of building container a5. The application of powder-like building material a15 takes place at least over the entire cross-section of object a2 to be manufactured, preferably over entire building field a8, i.e. the area of working plane a7, which can be lowered by a vertical movement of carrier a10.

The cross-section of object a2 to be manufactured is then scanned by laser beam a22 with a radiation exposure area (not shown), which represents diagrammatically an overlap of the energy beam bundle with working plane a7. Powder-like building material a15 is thus solidified at points which correspond to the cross-section of object a2 to be manufactured. These steps are repeated until such time as object a2 is completed and can be removed from building container a5.

To generate a preferably laminar process gas flow a34 in process chamber a3, laser sintering device a1 also contains a gas supply channel a32, a gas inlet nozzle a30, a gas outlet opening a31 and a gas discharge channel a33. Process gas flow a34 moves away over building field a8. The gas supply and discharge can also be controlled by control unit a29 (not represented). The gas extracted from process chamber a3 can be fed to a filtering device (not shown), and the filtered gas can be fed via gas supply channel a32 back to process chamber a3, as a result of which an air circulation system with a closed gas circuit is formed. Instead of just one gas inlet nozzle a30 and one gas outlet opening a31, a plurality of nozzles or openings can also be provided in each case.

Figure 2:
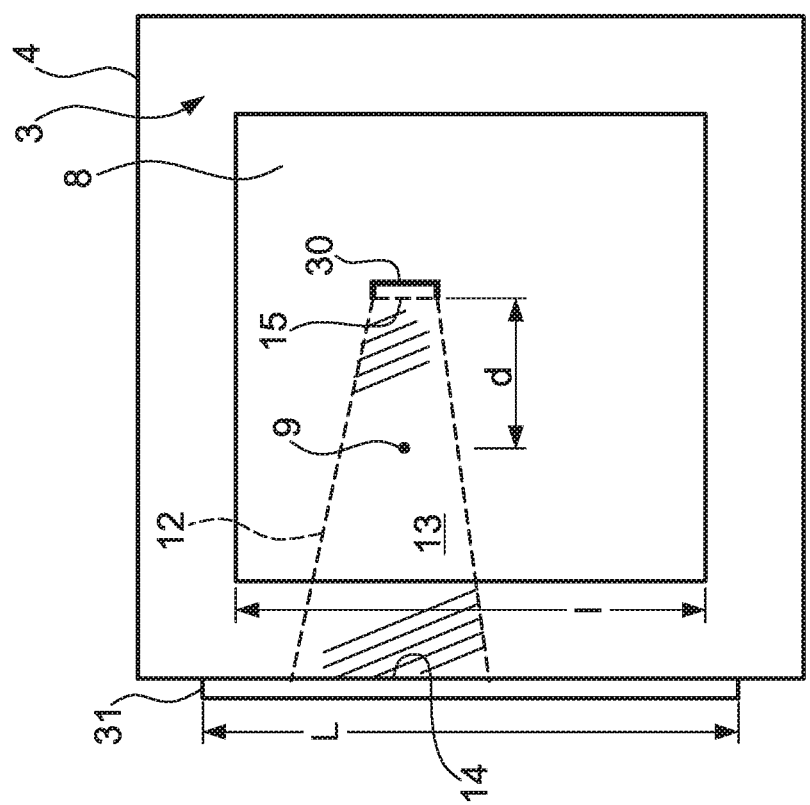
FIG. 2: shows a diagrammatic partial cross-sectional view of a device according to an embodiment of the invention with a gas inlet in a plane corresponding to intersecting line D-D according to FIG. 1, FIG. 3: shows a diagrammatic cross-sectional view of the device according to an alternative embodiment of the invention with a rotating gas inlet.

FIG. 2 shows a cross-sectional view onto a building field 8 according to intersecting line D-D in FIG. 1. Powder-like building material, in this case metallic or metal-containing powder, completely covers the area of square building field 8, which an ascending chamber wall 4 of a cuboid process chamber 3 surrounds. In the viewing direction of FIG. 2, a laser beam a22 as an energy beam bundle with a radiation exposure area strikes a point-like process point 9 as a reference process point on building field 8. There, it melts the building material, as a result of which impurities of the process atmosphere such as for example splashes, smoke or condensate can arise.

A movable gas inlet 30 is positioned on the right-hand side beside process point 9. Gas inlet 30 can be displaced in both spatial directions parallel to building field 8 and in addition can be rotated in its displacement plane about a rotary axis running perpendicular thereto. It supplies a flow to process point 9 and/or the area of the process chamber lying above the latter with a process gas in order to remove impurities from the area and optionally to largely prevent oxidation of building material at process point 9. The process gas and any smoke gas and/or condensate and/or further particles pass in a flow cone 12 proceeding from gas inlet 30 into a stationary gas outlet 31. Gas outlet 31 is housed in chamber wall 4 and extends there parallel to building field 8. Its length L in or parallel to the extension plane of building field 8 exceeds the side length I of a side of building field 8.

A control unit (not represented) provides for the control of the movements of gas inlet 30. It takes account of a maximum distance d, which gas inlet 30 can at maximum occupy with respect to process point 9. It thus provides for an adequate proximity of gas inlet 30 with respect to process point 9 and ensures its reliable flow supply with process gas.

Flow cone 12 arises from jet widening of the process gas flowing out jet-like from gas inlet 30. The outflowing process gas and the process gas for the most part at rest in process chamber 3 have different speeds. Between them, a shearing layer arises, from which a widening free jet develops, in that the process gas surrounding it is sucked in and drawn along with it. Flow cone 12 can be described in plan view approximately as an equilateral trapezium 13, the longer base side or base 14 whereof runs parallel to an outlet opening of gas outlet 31 and shorter base side 15 whereof runs parallel to an inlet opening of gas inlet 30. The control unit (not represented) controls movable gas inlet 30 in such a way that process point 9 always lies inside trapezium 13.

The control unit can thus assign an area inside building field 8 to gas inlet 30 with trapezium 13, in which process point 9 can lie. As long as process point 9 moves inside trapezium 13, gas inlet 30 does not need to change in its position. Consequently, movements of gas inlet 30 and the control required for this can be reduced, if the control unit for gas inlet 30 and optionally for each further gas inlet 30 can assume a trapezium area 13 as a working area on or above building field 8. In addition, it can take account of the fact that trapezium area 13 increases with increasing distance of gas inlet 30 from gas outlet 31, wherein in contrast the speed and effectiveness of the flow supply diminishes with increasing distance of the free jet.

For gas inlet 30 directed frontally onto gas outlet 31, trapezium 13 described above can at all events be assumed as flow cone 12. As soon as gas inlet 30 is set at an angle $\alpha$ with respect to gas outlet 31 as in FIG. 3, a trapezium 13 results, base 14 of which is inclined at the same angle $\alpha$ with respect to the outlet opening of gas outlet 31. However, because base 14 in any case usually lies outside building field 8, there is no relevant difference for the consideration of an area which can be supplied with a flow above building field 8 even with the set gas outlet 30.

Figure 3:
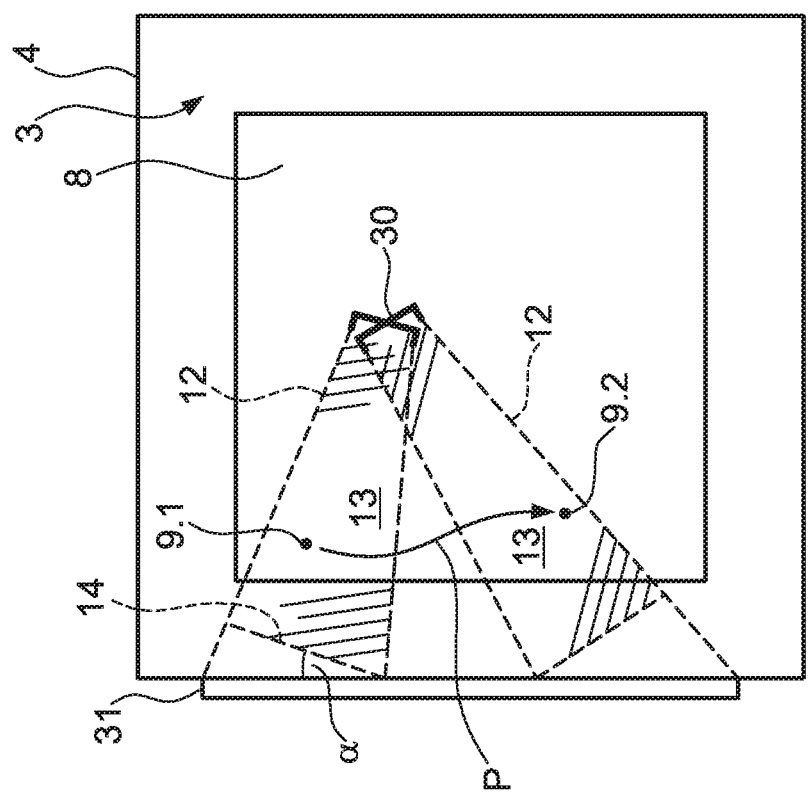

FIG. 3 illustrates moreover that an area above building field 8 can be subjected to a flow much more quickly by a rotation of gas inlet 30 than by its displacement. Displaceable and also rotatable gas inlet 30 thus enables a rapid and targeted flow supply to process point 9.1, which moves following the curved course of arrow P to the location of process point 9.2. With the combination of a displaceability of gas inlet 30 with its rotatability, slower travel movements of gas inlet 30 can be reduced in favour of its more rapid rotation movements. Gas inlet 30 is thus able to track a change in location of process points 9.1, 9.2 more quickly.

In combination with a movable gas outlet, a rotation of gas inlet 30 would require a large and relatively time-consuming displacement movement of the gas outlet. According to the invention, movable gas inlet 30 is combined with a stationary gas outlet 31. Its large length extension L along or parallel to a side of building field 8 promotes a targeted removal of gas from process chamber 3. The considerable control requirement for a movable gas outlet and a considerable time consumption for its travel movements are thus dispensed with. The control advantages of movable gas inlet 30 can be fully utilised together with stationary gas outlet 31.

Figure 4:
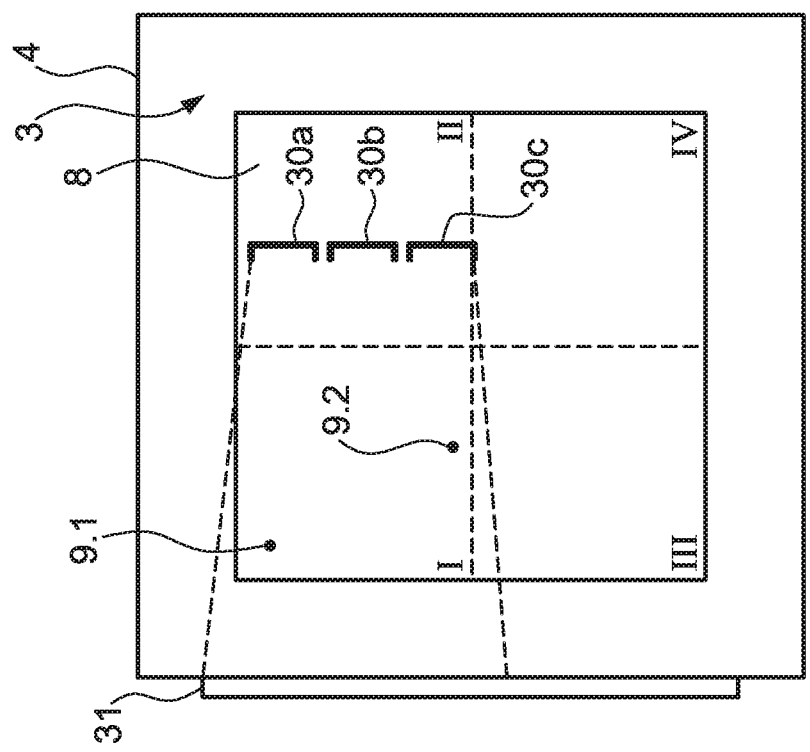
FIG. 4: shows a diagrammatic cross-sectional view of the device according to a further embodiment of the invention with three gas inlets.

FIG. 4 shows three gas inlets 30a, 30b, 30c, which are assigned to two process points 9.1, 9.2. Gas inlets 30a, 30b, 30c in the represented process situation are arranged in parallel beside one another and directed frontally onto gas outlet 31. Building field 8, above which they are located, is formally divided in terms of process into four square segments I, II, III, IV. The segmentation of building field 8 should be considered as having taken place based on need, inasmuch as it is guided by probabilities of the presence of process points 9.1, 9.2 in segments I, II, III, IV. For this purpose, it is assumed here that process points 9.1, 9.2 are often located simultaneously in segments I and III.

The position of the three gas inlets 30a, 30b, 30c is assigned in FIG. 4 to segment II, from which they supply a flow in common to complete segment I, in which the two process points 9.1, 9.2 are located. As long as they move solely in segment I, a control of gas inlets 30a, 30b, 30c is not required. The segmentation of building field 8 on the one hand optionally together with a control-based coupling of gas inlets 30a, 30b, 30c on the other hand reduces their control outlay and their travel paths.

If process points 9.1, 9.2 are displaced into segment III, gas inlets 30a, 30b, 30c are jointly guided over segment IV. Instead of three individual control procedures, only a single control procedure of gas inlets 30a, 30b, 30c coupled by control technology is required. If need be, the control-based coupling of gas inlets 30a, 30b, 30c can be suspended completely or partially or temporarily or permanently if a process step requires this. Thus, for example, gas inlets 30a, 30b can be jointly assigned to process point 9.1, which is displaced into segment II, while gas inlet 30c supplies a flow to process point 9.1 in segment IV (not shown).

Figure 5:
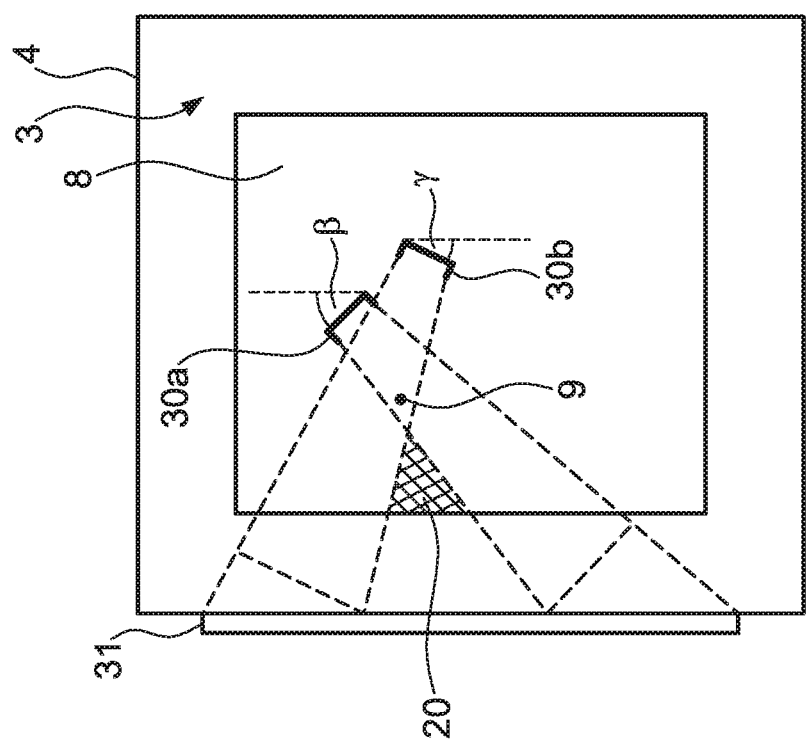
FIG. 5: shows a diagrammatic cross-sectional view of the device according to a further embodiment of the invention with two gas inlets.

FIG. 5 shows two gas inlets 30a, 30b, which are assigned to a single process point 9 and they supply a flow in common. Gas inlets 30a, 30b are not directed frontally onto gas outlet 31, but rather set at an angle $\beta$ or $\gamma$ to the latter. They each describe a trapezium 13, which mutually overlap in sections. Due to flow cones 112 directed at an angle to one another, it is to be assumed that their flows are mutually influenced. Due to the flow jet deflection, it can thus be assumed from this that an area 20 facing away from gas inlets 30a, 30b and facing towards gas outlet 31 and computationally not covered by trapezium 13 is nonetheless reliably subjected to a flow.

Apart from maximum distance d according to FIG. 2, the control unit also takes account of a maximum value for angle $\beta$ or $\gamma$ according to FIG. 5, by which gas inlets 30a, 30b may be rotated with respect to gas outlet 31. If the effective directions of gas inlets 30a, 30b and of gas outlet 31 are at an unfavourable, i.e. not sufficiently obtuse, angle to one another, it can lead to undesired turbulence and to an insufficient removal especially of smoke-laden gas. A maximum value for angle β, γ thus ensures a reliable purging of the surroundings of process points 9.1, 9.2.

Figure 6:
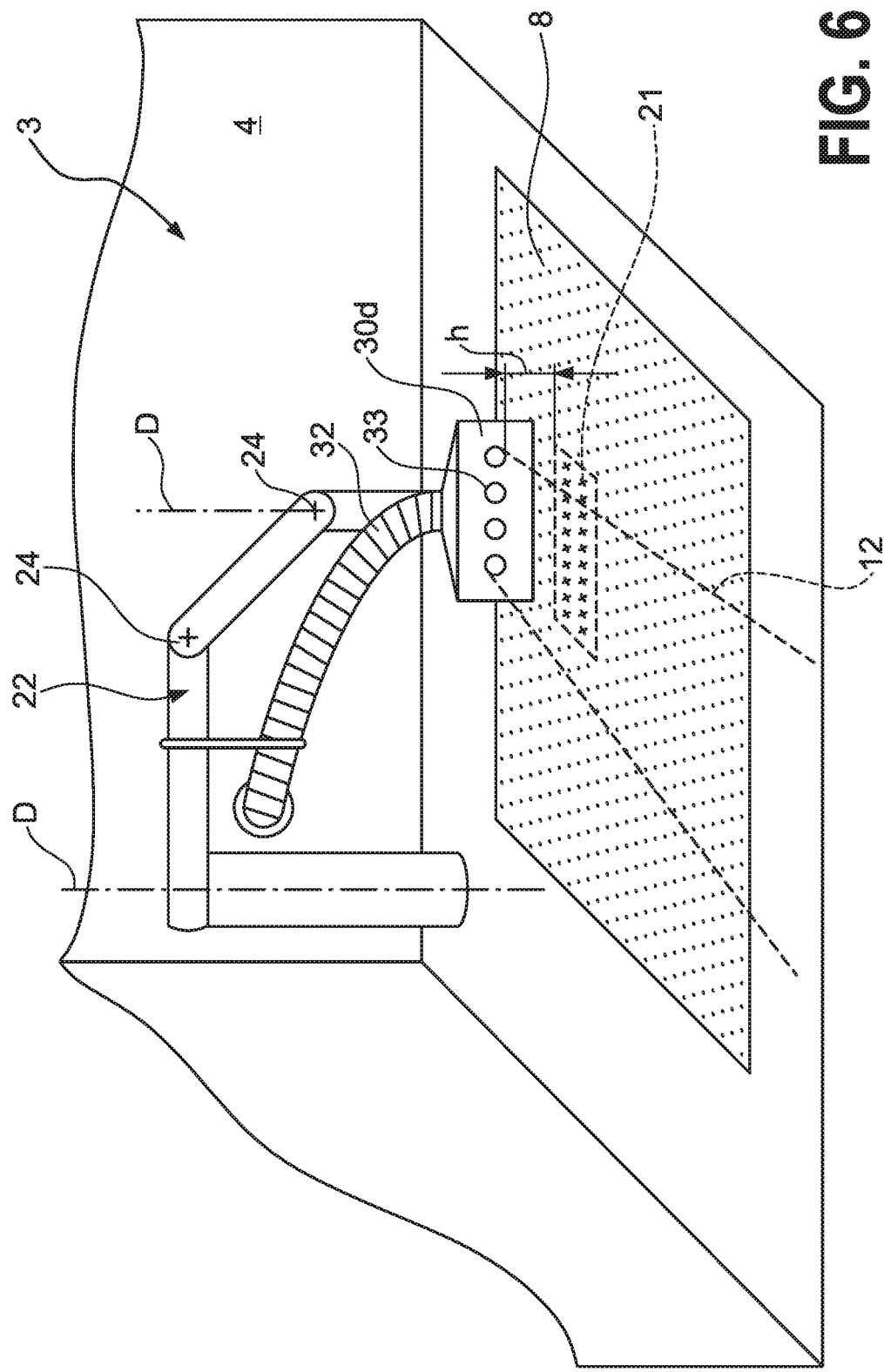
FIG. 6: shows a perspective view of a gas inlet moved by means of a robot arm.

FIG. 6 shows, in the partial cross-sectional perspective view of process chamber 3, a robot arm 22, which comprises two articulated joints 24 and can be rotated about a rotary axis D. At its free end, it carries a rotatable wide gas inlet 30*d*, which is supplied via a flexible gas supply channel 32. Robot arm 22 lies in process chamber 3 inside wall 4 and outside building field 8, so that gas inlet 30*d* can pass completely over building field 8 with a variable horizontal position and preferably in addition with a variable vertical distance therefrom, in order to approach a target flow supply zone 21 and supply a flow to it in a controlled manner. Gas inlet 30*d* comprises four nozzle-shaped inlet openings 33, from which a horizontally and vertically widening flow cone 12 emerges in common. Flow cone 12 lies in the area of gas inlet 30*d* at a height h just above target flow supply zone 21 of building field 8. Height h diminishes with the distance from gas inlet 30*d* and becomes h=0 when flow cone 12 contacts building field 8.

Figure 7:
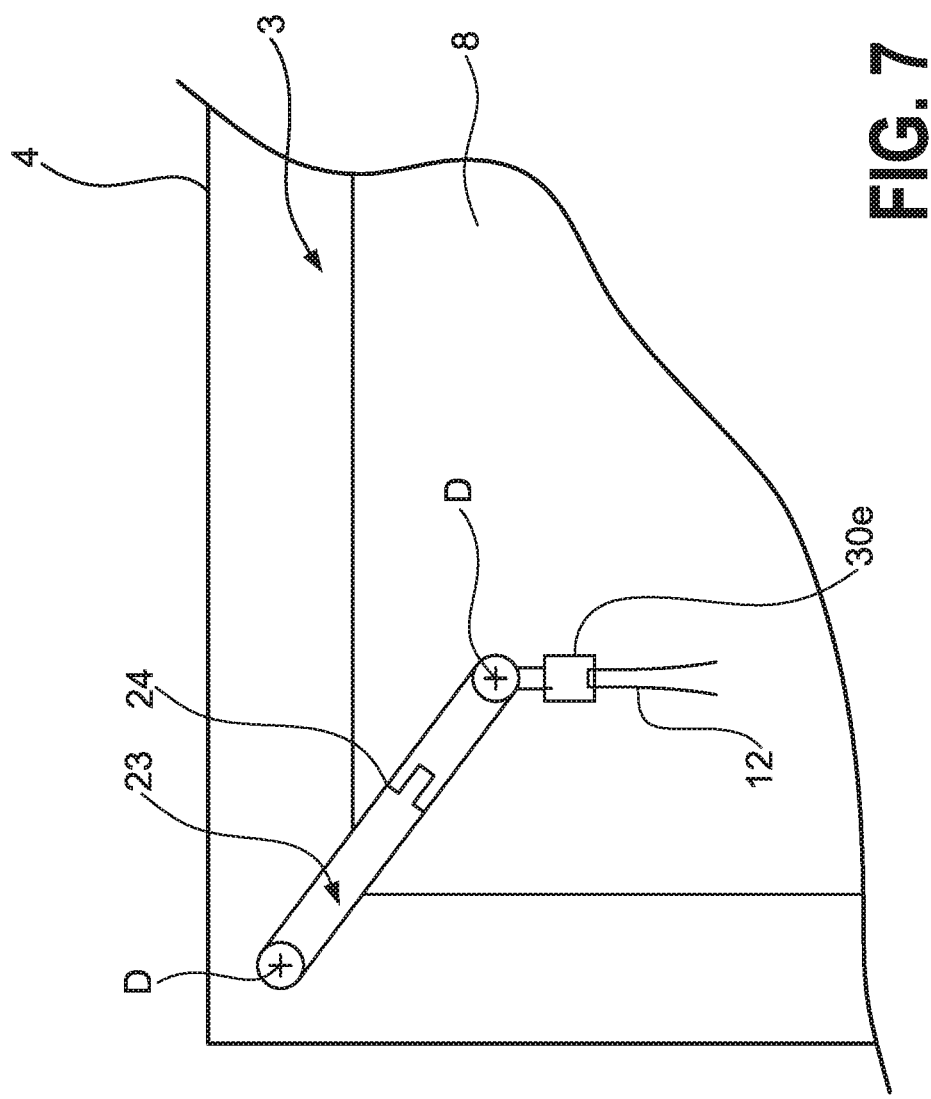
FIG. 7: shows a plan view of an alternative robot arm.

FIG. 7 offers a plan view onto a process chamber 3 with a robot arm 23, which is also arranged between wall 4 and building field 8. At its free end, it carries a narrow gas inlet 30*e*, which can travel horizontally or vertically above building field 8, in order to bring about a flow supply with a narrow flow cone 12. It comprises an articulated joint 24 and it or gas inlet 30*e* can be swivelled about vertical rotary axes D. For a flow supply to entire building field 8, a plurality of such robot arms 23 can be arranged in process chamber 3 and controlled separately or in common in the manner described above.

Since the preceding devices described in detail are examples of embodiment, they can be modified in the usual manner by the person skilled in the art over a wide range, without departing from the scope of the invention. In particular, the specific embodiments of the gas inlets in a form other than in the one described here can take place. The gas outlet or also the process chamber can also be constituted in another form, if this is necessary for space reasons or on design grounds. Furthermore, the use of the indefinite article "a" does not exclude the fact that the features concerned may also be present several times or repeatedly.

LIST OF REFERENCE NUMBERS a1 laser sintering or laser fusion device
a2 object
a3 process chamber
a4 chamber wall
a5 building container
a6 wall
a7 working plane
a8 building field
a10 movable carrier
a11 base plate
a12 building platform
a13 unsolidified building material
a14 storage container
a15 powder-like building material
a16 coater
a18 overflow container
a20 illumination device
a21 laser
a22 laser beam
a23 deflection device
a24 focusing device
a25 coupling window
a29 control unit
a30 gas inlet nozzle
a31 gas outlet opening
a32 gas supply channel
a33 gas discharge channel
a34 gas flow
3 process chamber
4 chamber wall
8 building field
9, 9.1, 9.2 process point
12 flow cone
13 trapezium (area)
14 longer base line, base
15 shorter base line
20 area
21 target flow supply zone
22, 23 robot arm
24 articulated joint
30, 30*a* . . . 30*e* gas inlet
31 gas outlet
32 gas supply channel
33 inlet openings
α, β, γ setting angle
d distance
h height above building field 8
D rotary axis
I side length of building field 8
L extension length of gas outlet 31
P arrow
I . . . IV segments of building field 8

The invention claimed is:

1. An Additive Manufacturing system using powder bed fusion and having a process chamber, a building field in a bottom area of the process chamber, a supply of powder build material, a spreader device that spreads successive layers of the powder build material over the building field, and an energy beam that is movable with respect to the building field to generate consecutive solidified cross-sections of an object being built in the process chamber in a layerwise fashion, the Additive Manufacturing system further comprising: at least one stationary gas outlet located outside of the building field and in a bottom of the process chamber and extending along a lateral side of the building field, the at least one stationary gas outlet removing gas provided into the process chamber; a process gas inlet device mounted for movement within the process chamber and movable above and over the building field, the process gas inlet device having an axis through it that is normal to the building field and the process gas inlet device is rotatable about the axis on a swivel, the building field presenting a planar building surface that is fixed relative to the movement of the process gas inlet device, the process gas inlet device having a directable output nozzle; a supply of process gas to the process gas inlet device; and a controller that directs the movement of the process gas inlet device, the controller rotating the swivel and aiming the directable output nozzle to direct a stream of the process gas, the controller orienting an output of the process gas inlet device along a line from the directable output nozzle through a point where the energy beam impinges upon the building field and toward the at least one stationary gas outlet, so as to propel effluents from where the energy beam impinges toward and into the at least one stationary gas outlet, the process gas inlet device moving in an x-y plane parallel to the planar building surface, the process gas inlet device being suspended above the building field and unconstrained in radial and swivel movement by any mounting mechanism which is also in a same x-y plane as the process gas inlet device.

2. The Additive Manufacturing system of claim 1, wherein the controller moves the process gas inlet device in tandem with positions of points of beam impingement over the building field.

3. The Additive Manufacturing system of claim 2, further including an additional stationary gas input located outside of the building field that provides another stream of the process gas across the building field in a laminar flow pattern.

4. The Additive Manufacturing system according to claim 3, wherein a number of process gas inlet devices diverges from a number of activatable energy beam bundles.

5. The Additive Manufacturing system according to claim 3, wherein the process gas inlet device includes more than two gas inlets that are able to be moved independently of one another.

6. The Additive Manufacturing system according to claim 1, wherein the process gas inlet device is movable above the building field and the controller moves the process gas inlet device in tandem with positions of points that are being scanned and melted.

7. The Additive Manufacturing system of claim 1, wherein the process gas inlet device further moves in a z direction orthogonal with the planar building surface.

* * * * *